(12) United States Patent
Hale

(10) Patent No.: US 11,349,372 B2
(45) Date of Patent: May 31, 2022

(54) COMBUSTION ENGINE AND ELECTRIC GENERATOR

(71) Applicant: UPGRADE TECHNOLOGY ENGINEERING LTD., Potters Bar (GB)

(72) Inventor: Christopher J. Hale, Potters Bar (GB)

(73) Assignee: Upgrade Technology Engineering Ltd.

( * ) Notice: Subject to any disclaimer, the term of this patent is extended or adjusted under 35 U.S.C. 154(b) by 0 days.

(21) Appl. No.: 16/494,704

(22) PCT Filed: Mar. 28, 2018

(86) PCT No.: PCT/EP2018/025074
§ 371 (c)(1),
(2) Date: Sep. 16, 2019

(87) PCT Pub. No.: WO2018/177606
PCT Pub. Date: Oct. 4, 2018

(65) Prior Publication Data
US 2020/0106339 A1  Apr. 2, 2020

(30) Foreign Application Priority Data

Mar. 31, 2017  (GB) ...................................... 1705274
Jun. 30, 2017  (GB) ...................................... 1710555
Nov. 28, 2017  (GB) ...................................... 1719773

(51) Int. Cl.
*H02K 7/00* (2006.01)
*H02K 7/18* (2006.01)
(Continued)

(52) U.S. Cl.
CPC ........... *H02K 7/1815* (2013.01); *F01B 23/10* (2013.01); *F02B 53/14* (2013.01); *F02B 55/02* (2013.01); *F02B 63/042* (2013.01)

(58) Field of Classification Search
CPC ....... F01B 23/10; F01B 29/08; H02K 7/1815; H02K 7/1807; H02K 7/1853; H02K 7/088;
(Continued)

(56) References Cited

U.S. PATENT DOCUMENTS 3,496,871 A    2/1970  Stengel
5,177,391 A *  1/1993  Kusase .................. H02K 16/02
                                                        310/114
(Continued)

FOREIGN PATENT DOCUMENTS

DE    10 2006 043 343 A1    3/2008
FR           3025950 A1 *   3/2016   .............. F01C 13/00
(Continued)

OTHER PUBLICATIONS

PCT/EP2018/025074 International Search Report, dated Sep. 26, 2018.
(Continued)

*Primary Examiner* — Julio C. Gonzalez
(74) *Attorney, Agent, or Firm* — Fay Sharpe LLP

(57) ABSTRACT

There is provided a combustion engine and an electric generator. The combustion engine comprises an engine housing, a cylindrical member configured to rotate about an axis within a cavity of the engine housing, a piston, and an engagement section for engaging the piston. The piston is mounted to the engine housing and the engagement section is mounted to the cylindrical member, or the piston is mounted to the cylindrical member and the engagement section is mounted to the engine housing, such that the piston and the engagement section periodically rotate past one another as the cylindrical member is rotated within the engine housing. The piston engages the engagement section as they rotate past one another, the engagement forcing the
(Continued)

piston to compress gases in a combustion chamber, which fire to drive the rotation of the cylindrical member. The electric generator may be driven by the combustion engine.

18 Claims, 8 Drawing Sheets

(51) Int. Cl.
  *F01B 23/10* (2006.01)
  *F02B 53/14* (2006.01)
  *F02B 55/02* (2006.01)
  *F02B 63/04* (2006.01)

(58) Field of Classification Search
  CPC ........ H02K 7/07; H02K 21/28; H02K 21/042; H02K 7/1869–1892; F02B 53/14; F02B 55/02; F02B 63/042; F02B 53/00; F02B 55/00; F01C 1/30; F01C 1/00; Y02T 10/17
  See application file for complete search history.

(56) References Cited

U.S. PATENT DOCUMENTS

| | | | |
|---|---|---|---|
| 6,230,670 B1 * | 5/2001 | Russell | F02B 57/08 123/44 B |
| 6,552,460 B2 * | 4/2003 | Bales | H02K 1/2793 310/156.35 |
| 7,615,894 B1 * | 11/2009 | Deal | B60L 58/30 310/14 |
| 7,629,713 B2 * | 12/2009 | Beaulieu | F02B 63/041 310/323.01 |
| 7,884,519 B2 * | 2/2011 | Okuno | H02K 21/12 310/156.38 |
| 10,181,769 B2 * | 1/2019 | Schuttenbach Von | F02F 7/00 |
| 2010/0024764 A1 | 2/2010 | Reinhardt | |
| 2012/0020823 A1 * | 1/2012 | Berthiaume | F04B 27/0472 418/8 |
| 2014/0361646 A1 | 12/2014 | Saito et al. | |
| 2016/0380496 A1 | 12/2016 | Hunstable | |
| 2017/0047821 A1 | 2/2017 | Klassen | |

FOREIGN PATENT DOCUMENTS

| | | |
|---|---|---|
| GB | 841198 | 7/1960 |
| GB | 2537011 A | 10/2016 |
| JP | 2017-044078 A | 3/2017 |

OTHER PUBLICATIONS

GB 1719773.2 Search Report under Sections 17 and 18(3), dated Jan. 23, 2018.

* cited by examiner

COMBUSTION ENGINE AND ELECTRIC GENERATOR

TECHNICAL FIELD

The present invention relates generally to combustion engine and electrical generator design. The proposed combustion engine may be used for efficient generation of mechanical power, or of electrical energy, for example by using the proposed electric generator.

BACKGROUND

Combustion engines are widely used, and are typically large, and or require many moving parts. Combustion engines can be used to spin a drive shaft of an AC or DC generator to produce electrical energy. A typical generator for example may consist of a rotor, stator, armature windings, a spindle and bearings and is a separate component to the machine that turns the spindle. Where a combustion engine is used for example, the conversion of a hydrocarbon fuel to mechanical energy, to electrical energy is typically highly inefficient. The need for efficient conversion of hydrocarbon fuel to electrical energy is largely driven by the increased use of battery power and needs for efficient charging methods or range extenders such as in hybrid electric vehicles.

It is therefore an aim of the invention to improve upon known combustion engines and electrical generators.

SUMMARY OF THE INVENTION

According to one aspect of the invention, there is provided a combustion engine comprising an engine housing, a cylindrical member configured to rotate about an axis within a cavity of the engine housing, a piston, and an engagement section for engaging the piston. The piston is mounted to the engine housing and the engagement section is mounted to the cylindrical member, or the piston is mounted to the cylindrical member and the engagement section is mounted to the engine housing. Then, the piston and the engagement section periodically rotate past one another as the cylindrical member is rotated within the engine housing. The piston is configured to engage the engagement section as the piston and the engagement section rotate past one another, the engagement forcing the piston to compress gases in a combustion chamber which fire to drive the rotation of the cylindrical member.

The combustion engine provides an efficient conversion of energy from the combusted gases into rotation of the cylindrical member. Preferably, the axis of the rotation of the cylindrical member is the same axis as the axis of the cylindrical shape of the cylindrical member. In other words, the cylindrical member rotates about its own axis.

The piston or the engagement section may be configured to rotate about an axis that is distinct from the axis of rotation of the cylindrical member. For example, the axis of rotation of the cylindrical member relative to the engine housing may be a first axis, and the piston or the engagement section may rotate relative to the engine housing about a second axis, the second axis being a different axis to the first axis.

The piston typically moves along a length of the combustion chamber to compress gases in the combustion chamber. Preferably, the piston moves back and forth in a linear reciprocating motion along the length of the combustion chamber as the gases are compressed and then fired.

In one embodiment, the combustion engine comprises a cylindrical member configured to rotate about an axis; and at least one combustion element. Each combustion element comprises at least one piston, and each combustion element is rotatable about a combustion axis. Each piston has a piston head and a base, and the cylindrical member comprises at least one engagement section on a surface of the cylindrical member. The piston head of each piston periodically engages the engagement section as the cylindrical member and the combustion element each rotate about their axes. A combustion chamber may be comprised in the combustion chamber at the base of the piston, or in the engagement section at the head of the piston. The piston may rotate about an axis that is distinct from the axis of rotation of the cylindrical member.

As the cylindrical member and the combustion element each rotate about their axes, the piston head engages the engagement section, and is pushed further into the combustion element, compressing gases in a combustion chamber at the base of the piston. Once the piston reaches its furthest extent into the combustion element, the gases in the combustion chamber are combusted, and the piston head is driven outwardly from the combustion element, forcing the engagement section of the cylindrical member away from the combustion element to drive the rotation of the cylindrical member.

According to another embodiment, the combustion engine comprises a cylindrical member configured to rotate about an axis, within a cavity of an engine housing. The cylindrical member includes at least one combustion element. Each combustion element comprises at least one piston, and each combustion element is rotatable about a combustion axis. Each piston has a piston head, and the engine housing comprises at least one engagement section in the form of a combustion chamber. The piston head of each piston periodically engages the engagement section and combustion in the combustion chamber drives the combustion element to rotate about its axis and the cylindrical member to rotate.

The cylindrical member may be a ring comprising one or more magnetic cores, and the rotation of the ring may pass the magnetic core(s) through a ring of coil windings. Volumetric and gravimetric advantages of combining a power source with magnetic induction are apparent in this invention, where the design of the combustion engine acts directly on engagement sections in the form of individual steel cores spaced between sections of magnetic cores.

This provides a more efficient method of converting a hydrocarbon fuel to mechanical energy which in turn is converted more efficiently to electrical energy, which is achieved by imparting a force onto sections of a ring of magnets that will continuously rotate through a collection of wire coils and in turn generate an electrical current.

The individual magnetic cores may be aligned with a N magnetic pole facing outwards and S magnetic pole facing inwards towards the centre of the magnet ring. Individual magnet sections may be bonded together with a spacing that is proportional to the length of the magnet which may be from 0% to 100%, that is with the magnets touching or separated by a distance at least equal to the length of the magnet, where the length is defined as the distance between the leading edge and trailing edge of the magnet as it passes through the coil windings. The most efficient separation may be from 1% to 5% or 5% to 15% or with reduced efficiency from 15% to 30% of the length of the magnets.

The magnets may be connected together to form an arc, being, but not limited to, ¼ of the circumference of the ring of coil windings, terminated by a steel section of a length typically equal to the length of one magnet, but may be the length of several magnets. Each arc of magnets and steel section may be connected together to form a ring that will move freely within the ring of coil windings. The steel sections may be designed to interface with the heads of the combustion pistons as they pass over the top of the active piston by allowing the piston to catch on a cylindrical bar at the bottom centre of the steel section. The piston head may be designed to have a mating curvature to the cylindrical bar, such that it can pivot as the steel section passes over the active piston.

The active piston may be connected to a centre shaft 313 as depicted in FIG. 3, either directly or via a cam as part of the piston bores assembly 312 to allow the piston head to tilt in the direction of travel of the steel section when it passes the point of maximum compression, to gain efficiency in the angle the piston acts on the steel section as it continues to travel following ignition of the hydrocarbon fuel. Each combustion element may have 4 pistons connected to the piston shaft, forming a piston set, such that once the active piston has travelled through a quarter turn and disengaged from the steel combustion interface section, the next piston is lined up to catch the following steel combustion interface section. In different embodiments of the invention, multiple steel combustion interface sections and piston sets can be implemented, typically 3 piston sets and steel combustion interfaces may be used, preferably located at an equidistance around the circumference of the circular coil windings. In different embodiments of the design 3 piston sets may be used for a magnetic ring with two or four steel combustion interface sections. Optimally, 4 combustion interface sections would be implemented for 3 piston sets, as this will lead to sequential firing of an active piston for each of the piston sets in turn, to most efficiently maintain the propulsion of the magnetic ring through the circular coil windings.

Each of the piston sets may be designed with a guide runner fixed to the piston sets base, such that as the pistons rotate, the piston prior to the active piston is drawn in towards the hub as the combustion chamber passes over an exhaust outlet, such that exhaust gas is forced out. On the next combustion cycle the piston opposite the active piston that is still travelling on the guide runner, will pass over an air intake valve where the guide runner will force the piston out to full extension, drawing in air. On the following combustion cycle, the piston following the active piston will pass over a fuel intake valve as it leaves the guide runner, allowing fuel to be injected under pressure into the combustion chamber. As the next active piston is under pressure, the lip of the piston head will run along the underside of the magnets as they pass over, until a steel interface section arrives, whereby the pressure of the fuel air mixture in the combustion chamber will allow the lip of the piston head to engage with the cylindrical bar of the steel interface section. With the piston head engaged with the cylindrical bar, as the steel interface section continues to pass over the active piston, the piston is forced down compressing the fuel air mixture. Once the piston reaches the point of maximum compression, the fuel is ignited and with the steel interface section continuing to move over the fired piston, the fired piston will act on the steel interface section propelling it round. Once the steel interface section has travelled past the maximum extension of the piston head, it disengages with the piston head and continues round, through the circle of coil windings.

According to another aspect of the invention, there is provided an electric generator, comprising a magnet ring and a plurality of coil windings. The magnet ring comprises a plurality of magnets arranged in a ring about an axis, each magnet forming an arc portion of the magnet ring. The coil windings encircle around the arc portions to form a toroidal shape enclosing the magnet ring, and the magnet ring is rotatable about its own axis relative to the coil windings to induce current in the coil windings. This provides an efficient method of generating electrical power, and is particularly suitable for use with the combustion engine described herein since the magnet ring can be formed as part of the cylindrical member. The coil windings do not need to fully enclose the magnet ring, for example one or more sections of the magnet ring may not be enclosed by coil windings so those section(s) can be used for drive wheels and/or combustion/engagement sections.

The electric generator allows more efficient utilisation of the field from the magnets. Traditionally, conventional brushless motors utilise one end of a permanent magnet, either N or S, arranged on the outside of the rotating stator where the rotating stator coils are energised in accordance with the approaching magnetic polarity during rotation. The magnetic field facing out from the motor is not utilised.

Since the electric generator proposed herein has coil windings encircling around the magnets of the magnet ring, to form a toroidal shape enclosing the magnet ring, the electric generator more fully utilises the fields from both N and S sides of the magnets, allowing more power to be generated for weight of the magnets. This helps reduce the size and/or weight of the electric generator. The coil windings do not need to be wound on rotating iron stators, further reducing weight compared to conventional electric generators. Therefore, there is provided a compact, light weight generator with a high gravimetric energy density, particularly when powered by an efficient combustion system such as that disclosed herein.

It will be appreciated by those skilled in the art that the electric generator can be used an electric motor, by driving the coil windings with electrical power to rotate the magnet ring relative to the coil windings.

Preferably, immediately adjacent ones of the magnets forming the magnet ring are spaced apart from one another by a field focusing material that concentrates the magnetic flux between the immediately adjacent magnets. The field focusing material is typically a soft magnetic material, for example a soft iron core or soft magnetic composite, such as a ferromagnetic composite.

The coil windings may be a series of individually wound coils that follow the shape of the magnets, which in the first embodiment are rectangular, although additional embodiments could use circular magnets with the N and S poles as the leading and trailing edge as it moves through the coil windings, the N and S poles of each magnet facing one another such that the magnets repel each other. Accordingly, the magnets have their N-S poles aligned in circumferential directions of the magnet ring. Alternatively, the magnets could have their N-S poles aligned in radial directions of the magnet ring, or aligned perpendicular to both the circumferential and radial directions.

The individual coil windings may be arranged to form arcs which are connected to arched tube section(s). The coil winding arcs and tube section arcs may be joined together to produce the toriodal shape within which the magnet ring is free to rotate. When the magnet ring of the electric generator is formed as part of the cylindrical member of the combustion engine disclosed herein, the arched tube sections may maintain cutouts to allow mechanical interaction between the engagement section and the piston as they rotate past one another.

The coil windings may be used as a heatsink to conduct heat from the combustion engine driving rotation of the magnet ring, to additional heat sinks. For example, the heat sinks may be fins on a mounting plate, or fins attached directly to the engine housing. Forming the coil windings in contact with one another helps enhance the heat transfer.

Design of the coil windings may be such that the width of the individual windings are either equal to the spacing between the magnets, or at least 1% of the length of the magnets or up to 100% of the length of the magnets, ideally 1% to 15%. Each of the individual coil windings can carry current in either direction using either ideal diodes, or switchable transistors such as Field Effect Transistors.

The individual coil windings may be connected or switched in a series or parallel configuration by a switching control unit to produce a variable or configurable output voltage. An arrangement of series and parallel coil windings would provide voltage outputs in the range but not limited to 0.1V to 1000V and current from 1 mA to 1000 A. Multiple outputs may be taken and may provide from 1 voltage output to 100 voltage outputs, typically 3 voltage outputs. For example, one 24V, 6 A output may be switched to one 24V, 3 A output and one 6V, 6 A output, or one 24V 3 A output, one 6V, 3 A output and two 3V 3 A outputs.

The coils may be connected either to a load while current is being generated or power source when the magnets are needed to be propelled through the coils to bring the combustion interface sections in line with the combustion pistons and activate combustion to initiate the continuous propulsion of the magnetic cores through the windings.

An apparatus is also provided in which the electric generator is used as an electric motor, typically by applying electric current to the coil windings so that the magnet ring is forced to rotate. The apparatus may comprise an output drive shaft connected to the magnet ring.

BRIEF DESCRIPTION OF THE DRAWINGS

Various embodiments of the invention will now be described by way of non-limiting example with reference to the accompanying drawings, in which.

DETAILED DESCRIPTION

Figure 1:
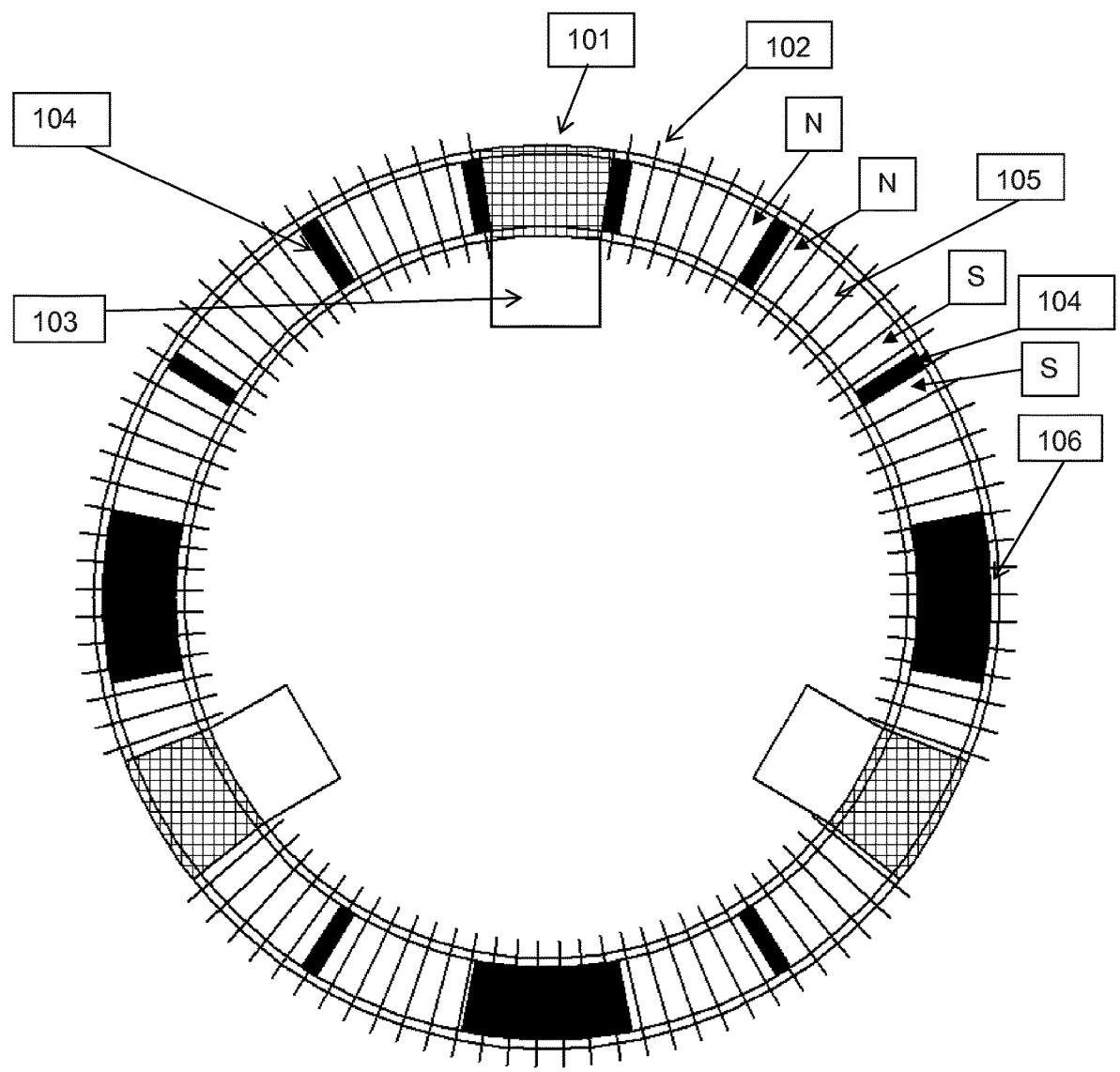
FIG. 1 shows a schematic diagram of a combustion engine according to an embodiment of the invention.

FIG. 1 depicts the concept of the engine as an inner ring of permanent magnets with steel interface sections, that are forced to rotate through a ring of coil windings in order to generate an electrical current.

The combustion system 103 is located internally of the ring of magnets 105, another embodiment may have the combustion system 103 external to the ring of magnets 105 as a potentially more effective interface with the steel combustion interface sections 106.

FIG. 1 shows an embodiment of the combustion engine where the combustion systems 103 are internal to the ring of coil windings 102 but in other embodiments may provide a more effective transfer of mechanical energy due to the curvature of the steel combustion interface section 106 if the combustion systems were external to the ring of coil windings.

The Combustion Engine Generator is designed to generate an electrical current in the coil windings 102, detailed further below in FIG. 2, through the rotation of the ring of magnets 105 that pass through the centre of the coils. The ring of magnets are permanent magnets with their N and S poles aligned along circumferential directions of the magnet ring, parallel to the axes of the coil windings 102, as shown in FIG. 1. The magnets 105 are connected in this arrangement so that either the North poles of two immediately adjacent magnets face one another, or the South poles of the two immediately adjacent magnets face each other, such that the magnets are forced to repel each other. In alternate embodiments, the N and S poles may be aligned perpendicular to the axes of the coil windings 102.

Each magnet 105 is bonded to the next magnet such as to provide a separation between the magnets where opposing lines of force from N/N or S/S magnetic coupling can be focused. The magnets may be separated by a field focusing material 104 such as a soft magnetic material that concentrates the magnetic flux to more efficiently generate electrical potential in the coil windings. The soft magnetic material may for example be a soft iron core, or a soft magnetic composite material. One suitable soft magnetic material is a soft magnetic composite material in the form of a ferromagnetic composite material that is formed by ferromagnetic powder particles surrounded by an electrically insulating film. The thickness of the bonding compound or field focusing material 104 depends on the strength of the magnetic field of the magnets and the focusing of the magnetic lines of force that may also be determined as a function of the size of individual coil winding sections 206 in FIG. 2. The length of the permanent magnets may also be determined as a function of the field strength of the magnets and concentration of the lines of flux to provide the most efficient transfer of energy to the individual coil windings 102. FIG. 1 by way of example depicts 12 magnets 105 in the ring of magnets with 4 steel combustion interface sections 106, other embodiments of the invention may use multiple magnet sections determined by the size of the magnetic ring and the efficiency of the flux lines from each magnet in conjunction with the individual coil windings 102 to increase the efficiency or effectiveness of the system. The number of magnets would be dependent on the diameter of the ring. An example would be 70 magnets in a ring with diameter 90 mm.

In order to propel the ring of magnets through the coil windings, there are steel combustion interface sections 106 that are placed within the ring of magnets and bonded to the mating magnets with bonding compound 104. The steel combustion interface sections allow the combustion system 103 detailed in FIG. 3 to impart a mechanical force and propel the magnets through the circular ring of coil windings 102. The number of steel combustion interface sections detailed in FIG. 1 is exemplary and is not limited to 4; in other embodiments the steel combustion sections may be 1 or any practical number depending on the velocity requirements of the magnetic ring and stability of the current generation through variation in velocity, as the magnetic ring slows prior to another injection of mechanical force from the combustion system. Applying more steel interface sections 106 into the ring of magnets would maintain a more uniform velocity of the magnetic ring, additionally this could also be achieved, to increase the uniformity of travelling velocity by increasing the number of combustion systems 103 which as a minimum could be 1 and as an example as depicted in FIG. 1 as 3, but in other embodiments may have any practical number according to the requirements of each application of the invention.

Within the ring of coil windings 102 are by way of example, but not limited to 3 combustion interface tube sections 101. There will be one interface section for every combustion system 103. The interface tube sections are designed to allow the steel combustion interface section to move freely given that the forces of the combustion system may act to increase friction between the steel sections and interface tube wall. The tube sections may utilise low friction material or in another embodiment may utilise bearings. The tube sections have an opening to allow mechanical interaction of the pistons 304 depicted in FIG. 3 with the steel sections for the length of travel of the pistons as they interface with the steel sections.

Figure 2:
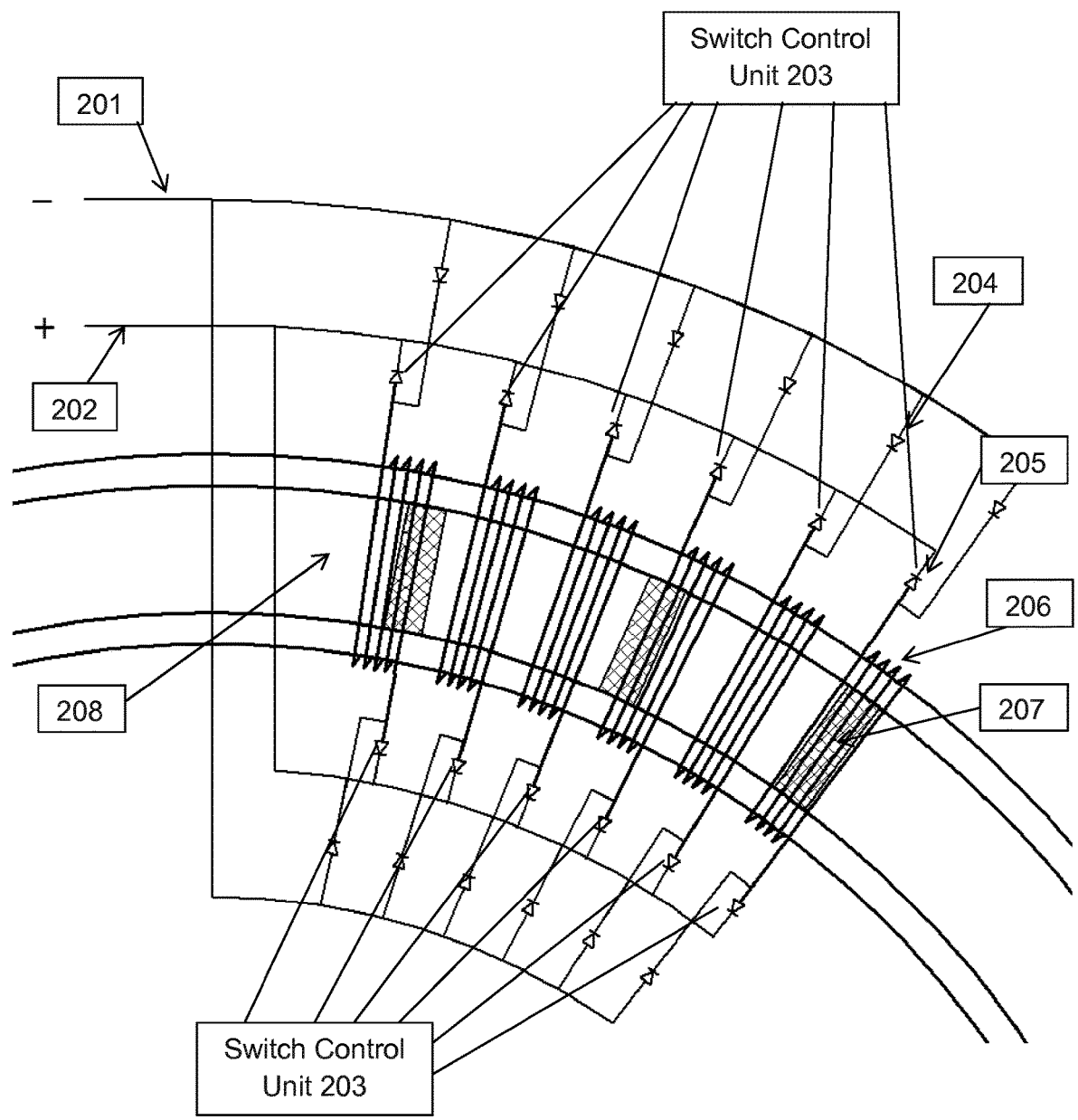
FIG. 2 shows a more detailed view of coil windings forming part of the FIG. 1 embodiment.

FIG. 2 is a more detailed depiction of the individual coil windings 102 of FIG. 1, where the direction of current flow through the coil windings will change with respect to the lines of magnetic field that will cut through windings as the permanent magnets rotate through the centre of the windings. As the combustion process requires motion of the steel combustion interface sections, the switch control unit 203 will be able to supply current to individual sets of windings, such that a force will be generated to propel the ring of magnets and steel sections such that the steel interface sections can activate the combustion process, which will then be self sustaining.

As the magnetic flux lines pass N-S, there is a point during the travel of the permanent magnet 208 through the windings that the direction of field is reversed, reversing the direction of current flow through the windings. By having multiple windings as detailed in FIG. 2, the point where a coil is effected by a reversal of magnetic lines of flux, would cause minimal impact on the cancellation of current flow in that winding section, to the overall current being generated in the other winding sections. Control of the current flow in the individual coil windings 206 will be maintained by the switch control unit 203 that can control the switching of ideal diodes or transistor devices 204 to the negative of the power source or load 201 as the current direction changes and also the switchable transistors or thyristors 205 to the positive of the power source or load 202. The switching control is to maintain an optimum transfer of energy as the magnetic field lines pass the coil windings 206 and the changing field promotes a reversal of the direction of current flow. Switching control also enables a configurable output voltage by changing the series parallel connection of individual coils. Multiple output voltages may be taken where 201 and 202 may be an independent voltage output as in this example (but not limited to) 6 coil sections 206, where another collection of 6 coil sections may have their outputs 201 and 202 connected in series or parallel. This allows multiple tap off voltages to be produced. The width of windings for each coil section 206 may be determined as a function of the size of the permanent magnets 208 or width of the inter magnet bonding material 207.

The switch control unit is also intended to switch power from a power source in a controlled manner such that the coil windings can be energised to impart a force on the magnets for the purpose of moving the steel combustion section 106 in FIG. 1 to the combustion system 103 as a way of priming the system when the magnetic ring starts from rest.

Figure 3:
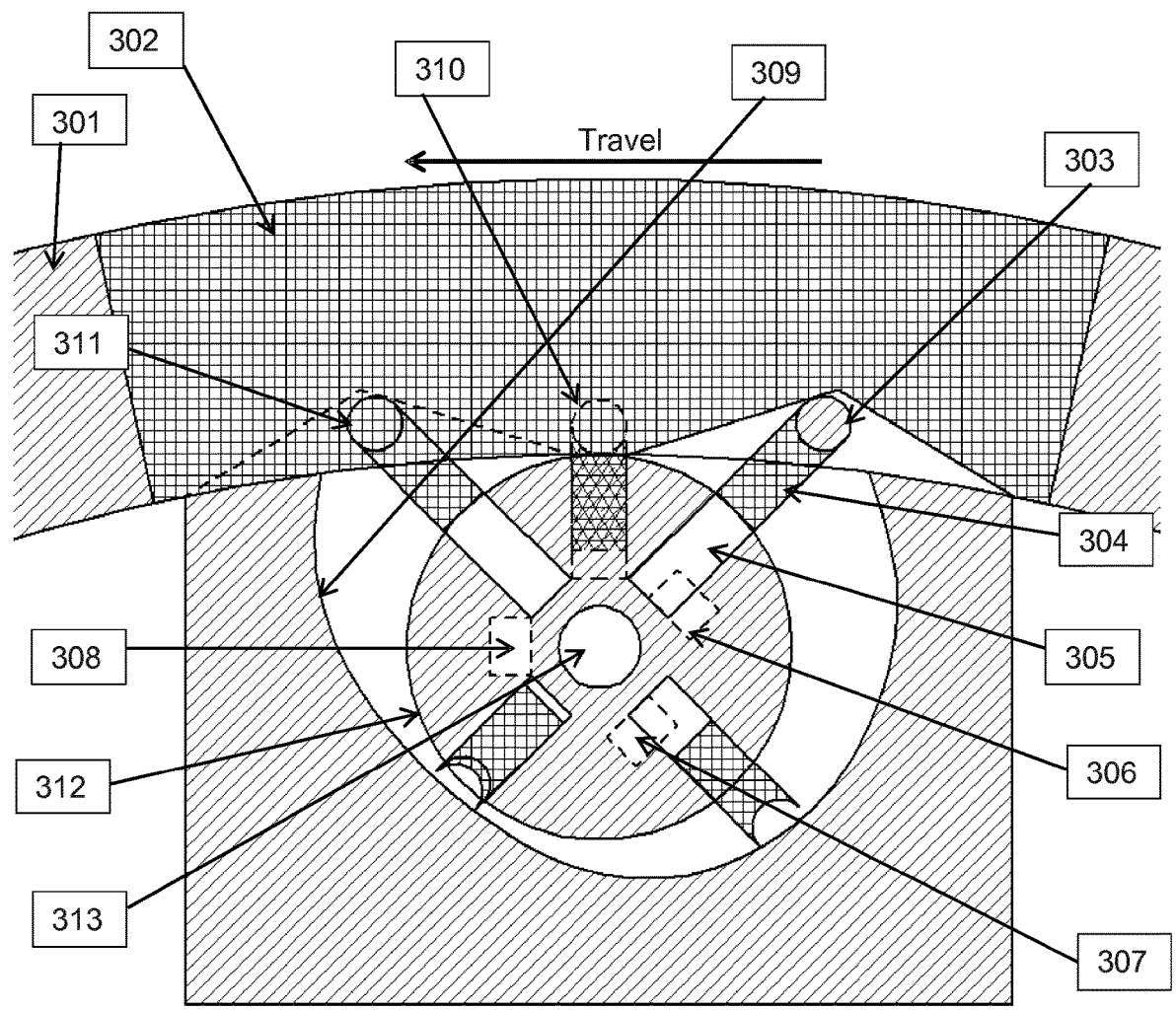
FIG. 3 shows a more detailed view of a combustion element forming part of the FIG. 1 embodiment.

FIG. 3 shows a more detailed view of one of the combustion elements 103 of the combustion engine. Each combustion element is mounted to an engine housing of the engine. The combustion element will impart a force on the steel interface sections such that they can be propelled through the ring of coil windings. There is typically a set of four pistons 304 for each combustion element that will rotate each time a steel section passes over, moving the pistons through the priming phases as detailed below.

The set of 4 pistons 304 operates in the piston bores assembly block 312 which rotates around a central axis 313, whereby the active piston is determined as the piston that will next engage or is engaged with the cylindrical bar 303 attached to the steel combustion interface section 302. As the steel section 302 passes over the active piston, with the positive pressure created by the injection of fuel into the combustion chamber 305 the piston head is forced to engage with the cylindrical bar 303. As the steel section continues to travel, the active piston is forced down, compressing the fuel air mixture, depicted in the diagram at location 310 which is the point of maximum compression. As the steel section continues to travel and either just before, during, or just after the point of maximum compression 310, the fuel air mix is ignited and the force of the combustion on the piston will propel the steel section along the direction of travel until the maximum extension of the piston is reached and the cylindrical bar detaches from the piston head as depicted at location 311. The diagram shows a circular rotation of the piston heads, although in other embodiments a cam profile or pivoting action may be implemented to provide a more effective angle of interaction of the piston head with the bar at the moment of combustion.

As the pistons rotate, the piston preceding the active piston will pass an exhaust port 308 to expel the exhaust gas as the piston is forced inwards by the shape of the housing wall 309. As the pistons next rotate, the piston opposite the active piston will pass an air intake valve 307 where a guide rail will pull the piston out, following the housing wall, drawing in air. As the pistons further rotate, the piston following the active piston will pass a fuel inlet valve 306 which will inject fuel under pressure moving the piston head into position where it may connect with the next steel interface section that passes, repeating the process.

Figure 4:
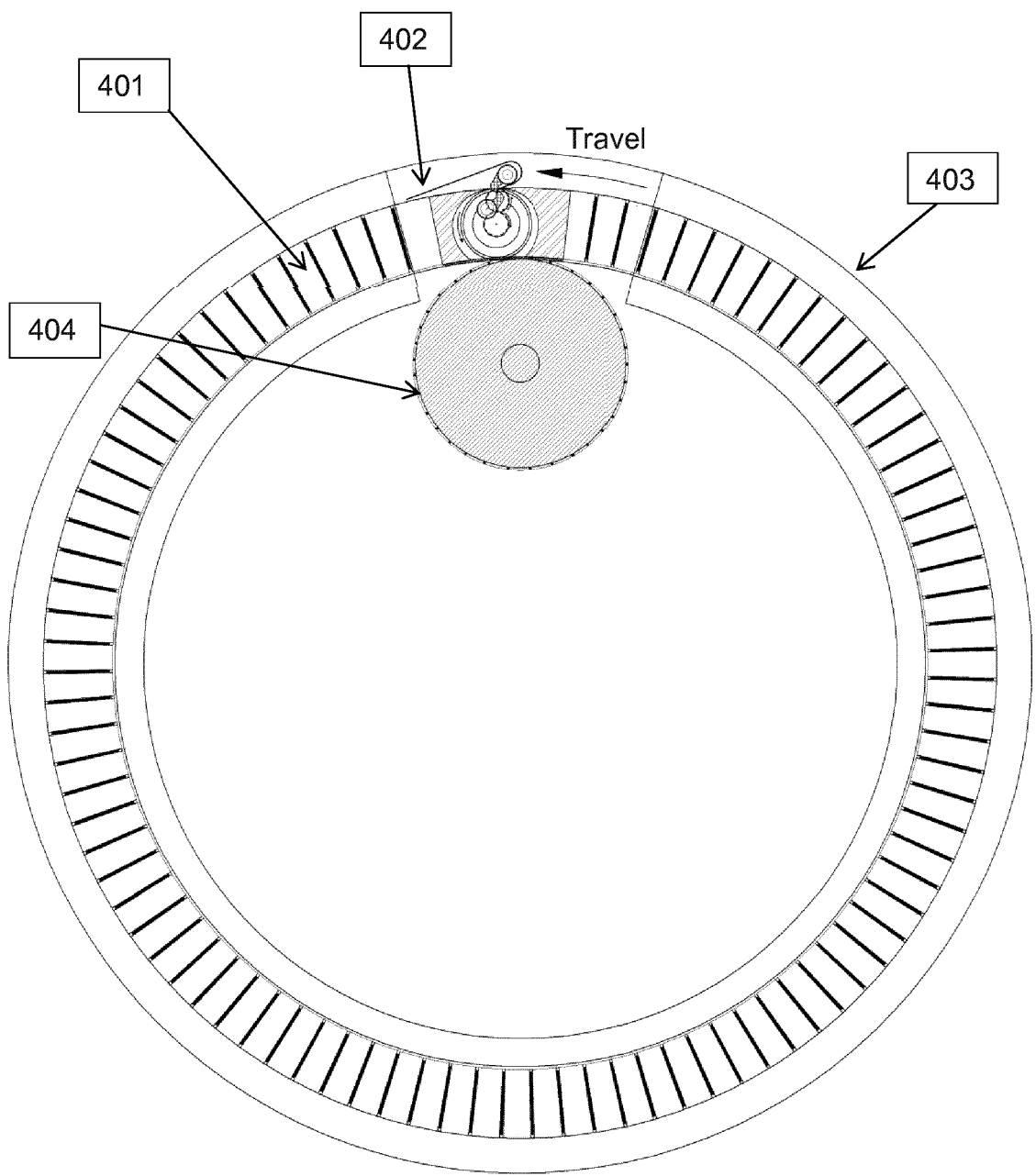
FIG. 4 shows a schematic diagram of a combustion engine according to another embodiment of the invention.

FIG. 4 shows a schematic diagram of the concept of an alternative combustion system, comprising a magnet ring 401 propelled through a set of coil windings 403 for generating an induced electrical current. The coil windings 403 are fixed to an engine housing which is stationary, and the engine housing defines a ring shaped cavity in which the magnet ring 401 is located. The magnet ring 401 is rotatable within the ring shaped cavity of the engine housing to induce the electrical current in the coil windings 403. The piston block 402 is formed as an arc segment of the magnet ring, and propels the magnet ring to rotate through the coil windings 403 that are fixed to the engine housing, as is described in more detail further below with reference to FIG. 5. A drive gear 404 is rotatably fixed to the engine housing, extends into the ring-shaped cavity, and comprises gear teeth for meshing with corresponding gear teeth of the magnet ring. Therefore, as the piston block 402 is propelled around within the ring shaped cavity, the gear teeth on the magnet ring force the drive gear 404 to rotate. The rotation of the drive gear 404 provides a mechanical drive through a drive shaft to an externally connected system. The externally connected system is by way of example but not limited to, an automotive gearbox, direct wheel drive, or an alternative electrical generator system. In other embodiments, the drive gear may be on the outside of the ring of magnets. The drive gear may be a wheel that uses friction (such as a rubber wheel) to rotate the magnetic core or rotated by the magnetic core. The drive gear 404 may be omitted in alternate embodiments.

Figure 5:
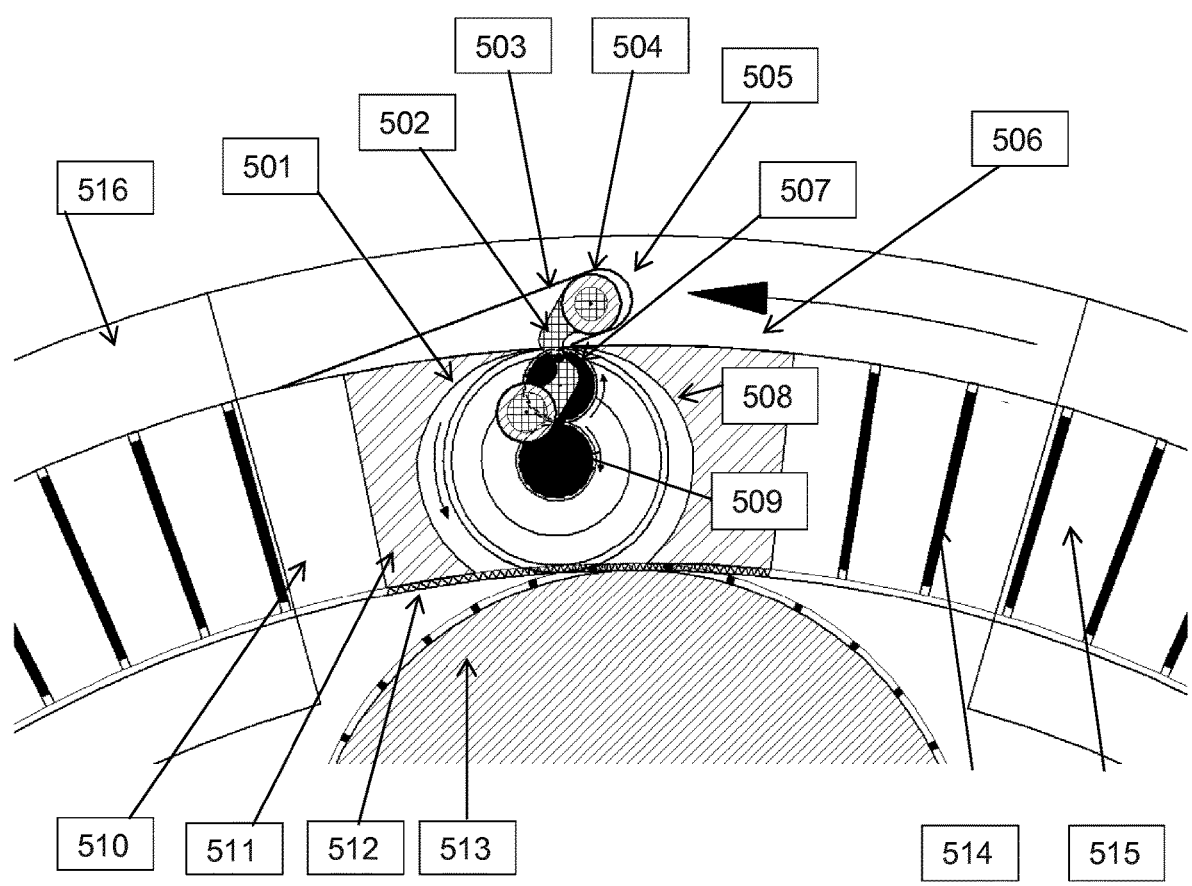
FIG. 5 shows a more detailed view of a combustion element forming part of the FIG. 4 embodiment.

FIG. 5 shows a more detailed schematic diagram including the piston block 402 of the alternative combustion system of FIG. 4. The piston block 402 is labelled as 506 in FIG. 5. The piston block 506 has a cavity which houses a drive wheel 501 that will rotate within the piston block 506, and the drive wheel 501 interfaces with a gear arrangement 511, the gear arrangement 511 being fixed to the engine housing defining the cavity in which the magnet ring rotates. A static piston wheel 509 is fixed on the same axis as the drive wheel 501, and a rotating piston wheel 507 is rotatably mounted to a point on the drive wheel 501, the point being offset from the axis of the drive wheel 501. The rotating piston wheel 507 has a ring of gear teeth, which mesh with a ring of gear of the static piston wheel 509. The static piston wheel 509 is physically attached to the piston block 506 so as to prevent relative rotation between the piston wheel 509 and the piston block 506. Therefore, as the drive wheel 501 is rotated, the meshing of the ring of gear teeth around the rotating piston wheel 507 with the ring of gear teeth around the static piston wheel 509, causes the rotating piston wheel 507 travel around the static piston wheel 509, and to rotate on its own axis. The rotating piston wheel 507 is attached to the drive wheel 501 through a spindle at the centre of the rotating piston wheel 507.

A piston lever arm 503 is rotatably connected to the rotating piston wheel 507, using a pivot pin 502 that is offset from the axis of the rotating piston wheel 507. The piston lever arm 503 supports two piston heads 503 that are at 180 degrees to one another about the pivot pin 502 at the central axis of the piston lever arm 503. The piston lever arm 503 is freely rotatable about the pivot pin 502. The engine housing has a combustion chamber 505, into which one of the piston heads enters as the magnet ring rotates within the engine housing. Combustion occurs when the piston head 504 has reached maximum compression of the fuel in the combustion chamber 505, in the position shown in FIG. 5, whereupon the expanding gases force the piston head 504 back out of the combustion chamber. The piston head 504 connected to the piston lever arm 503 forces the rotating piston wheel 507 to rotate as the piston head 504 travels out of the combustion chamber. Since the rotating piston wheel 507 meshes with the static piston wheel 509, the drive wheel 501 is forced to rotate.

A ring of gear teeth around the drive wheel 501 meshes with the gear arrangement 511 fixed to the engine housing, so that as the combustion causes the drive wheel 501 to rotate, the piston block 506 of the magnet ring is forced to pass along the gear arrangement 511, forcing the magnet ring to rotate within the ring shaped cavity of the housing. Accordingly, the drive wheel 501 acting on the wheel gear 511 which is statically connected to the coil windings 516, will propel the piston block 506 through the coil windings.

As the drive wheel 501 continues to rotate, the piston heads 504 are guided by the piston guide 508, which defines the walls of the cavity in which the drive wheel 501 is mounted in the piston block 506. When the piston lever arm 503 has nearly completed a full revolution, the second piston head travelling along the piston guide 508, will be guided to the combustion chamber 505 opening where it will locate within the combustion chamber and be forced up the combustion chamber as the drive wheel 501 continues to rotate, to compress the fuel and the combustion process repeats. Rotation of the drive wheel 501 only occurs when it is running along the gear arrangement 511, such that as the piston block 506 travels through the coil windings 516, the drive wheel 501 disengages from the gear arrangement 511 and the piston lever arm 503 is no longer moved round and the piston heads are at rest in a position that allows unimpeded travel through the coil windings. As the piston block 506 again exits the coil windings 516 on approach to the combustion chamber 505, the drive wheel 501 locates with the gear arrangement 511, to rotate the piston lever arm 503 and move the piston head 504 into the combustion chamber 505 for the process to repeat.

As the piston block 506 travels through the coil windings 516, it pushes the ring of magnets 515 which are each separated by a magnet spacer 514 to form an intensified magnetic field acting perpendicular to the face of the magnets such that a magnetic field can cut through the coil windings 516 to induce electrical current. The magnets 515 are connected in this arrangement with their North and South poles facing each other, such that the magnets are forced to repel each other.

The magnet spacers may also be designed to provide a drive guide cavity 510 to act as a guide for locating the drive gear teeth 512 and in turn acting as gearing to turn the drive gear 513 (shown in FIG. 4 as drive gear 404). The rotating drive gear 513 allows the rotation of a spindle to interface with for example, an external gearing system or direct wheel drive. In another embodiment, drive gear 513 may be used to drive rotation of the magnet ring, in place of a combustion system, removing the need for combustion interface section 506 as the primary means to drive the magnetic core. The drive wheel may be driven by any practical means, such as a combustion engine connected through a spindle.

FIGS. 6a to 6c show schematic diagrams of further embodiments of the combustion system, comprising a magnet ring 601 propelled through a set of coil windings 610 for generating an induced electrical current. The coil windings 610 are fixed to an engine housing 606 which is stationary, and the engine housing defines a ring shaped cavity in which the magnet ring 601 is located. The magnet ring 601 is rotatable anticlockwise within the ring shaped cavity of the engine housing to induce the electrical current in the coil windings. The piston lever block 605 is formed as an arc segment of the magnet ring, and propels the magnet ring to rotate through the coil windings that are fixed to the engine housing.

As shown in FIG. 6c, a piston lever arm 602 is rotatably fixed to the piston lever block, and incorporates a gear mechanism 609 for meshing with corresponding gear teeth 608 of the engine block 606. The gear teeth will have optionally two functions, a first function of rotating the piston lever into the piston cylinder to act on the combustion engine piston 603 in order to compress the fuel in the cylinder head 604. Combustion of the compressed fuel will force the piston 603 to act on the head 615 of the piston lever arm which in turn will slide on the inner wall of the engine block 606 forcing the piston lever arm to rotate clockwise, and whilst the gear teeth are meshed, drive the piston lever block round. Accordingly, the piston lever arm engages the piston periodically, in this embodiment each time that the piston and the engagement section rotate past one another.

In an alternative embodiment shown in FIG. 6b the engine block 606 does not have the gear teeth 608, and the piston acting on the head of the piston lever arm which is forced to run along the inner wall of the engine block will push the piston lever block round. In this embodiment, the engine block instead has a pin 607 which is controlled by a solenoid to move into the path of the gear mechanism 609 when the gear mechanism passes the cylinder head 604.

Whilst the piston lever block is travelling through the coil windings, it will be aligned such that the gear teeth 609 and piston lever arm heads 615 do not extend past the arc of the outer diameter of the magnet ring. For example, refer to FIG. 6a which shows the positions when the piston lever block 605 has rotated anticlockwise past the cylinder head 604. In order to initially rotate the piston lever arm to engage in the engine block chamber and hence act on the piston, a hall effect sensor 614 that can determine the location of the piston lever block by a change in the magnetic field measurement detectable from the rotating magnet ring, would allow for precise timing of the fuel injector system, electronic ignition and activation of the solenoid pin 607 that would enter through a cavity in the piston lever block to catch on the lead gear tooth 609 forcing the piston lever arm to rotate.

Exhaust gas from the combustion will be directed to the engine block and rotating magnet ring at the exhaust outlet 611. The magnet spacers may be produced such that there is a recess to carry the expelled exhaust gas. As the magnet ring rotates the expanding exhaust gas will act to assist the rotation of the magnet ring on the same principle as a turbine. The continued rotation of the magnet ring with the spacer recesses, will act to draw in fresh air from the air intake valve 612. The air intake valve being a one way valve to prevent exhaust gas from escaping when pressure in the combustion chamber is high, but allow fresh air when pressure in the exhaust chamber is low due to the rotation of the magnet ring. Waste exhaust gas will be expelled through the waste exhaust port 613 just prior to reaching the combustion block. Additionally, the coil windings 610 may use spacers between the coils that allow a cavity to be produced and act as a baffler for exhaust gas, reducing the audible sound from exiting exhaust.

Additionally the magnet ring 601 has a small hole running concentrically through the centre of the magnet ring around its axis, in which a wire 616 can be threaded to assist in holding the magnet assembly together and prevent the magnets which are fixed with opposing polarities from breaking the bonding used to affix the magnets to each other or the magnet spacers, which may occur due to the increased stress imposed on the magnet assembly during its forced rotation and as the velocity of rotation increases.

A further embodiment as shown in FIGS. 7a to 7c, in which the ends of the piston lever arm have pistons 702 pivotally mounted to them, so that the pistons are rotatable relative to the piston lever arm about piston axes. Compression of the gas in the combustion chamber occurs from the head of the piston and combustion on the piston head will propel the piston block round.

Exhaust gas exiting the combustion chamber 703 at the piston entry/exit point 705, and will continue to propel the magnet ring using the spacer recesses as described above, drawing in fresh air from the air intake valve 704. A solenoid pin 710 will act on the lever arm gear 708 in the same way as described above on detection of the location of the piston block by a hall effect or similar sensor. FIG. 7b shows a solenoid pin 710 which may be the same or additional to the gear activating pin 607, acting first to direct the piston 702 into the combustion chamber entry and optionally by a guide runner 802 (see FIG. 8) that locates with the pin as it passes, to manoeuvre the head of the piston 702, angling it such that contact with the combustion block inner wall will guide the piston head to the combustion chamber 709 where compressed fuel and air will be combusted to expel the piston head and rotate the piston block.

Figure 6:
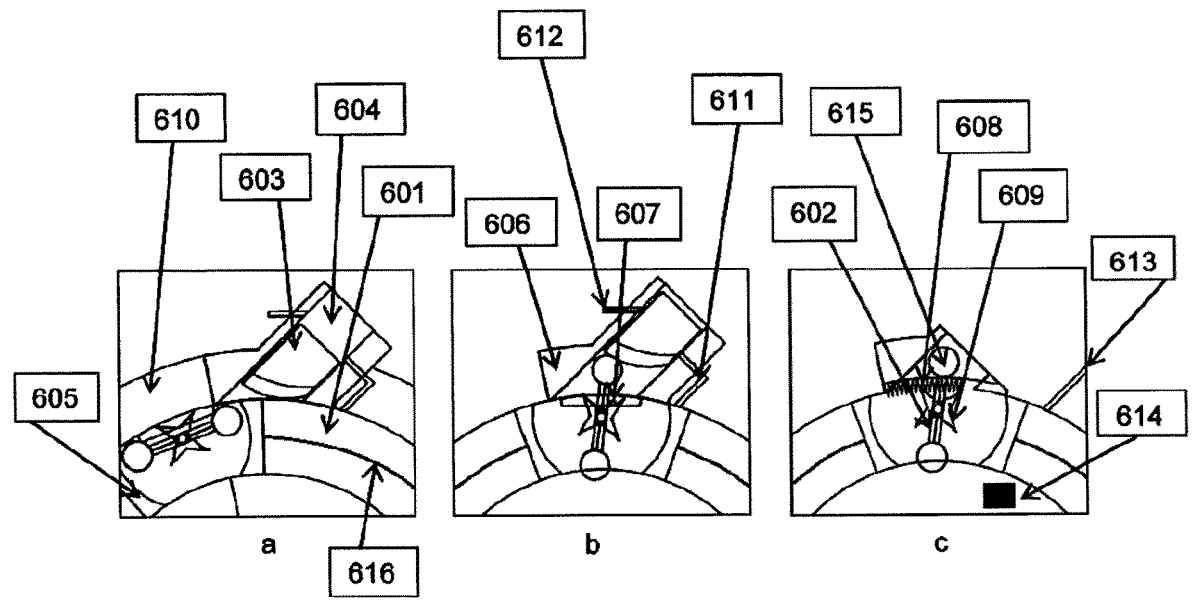
FIGS. 6a to 6c show schematic diagrams of a combustion elements and engagement sections of further embodiments of combustion engines according to the invention.
Figure 7:
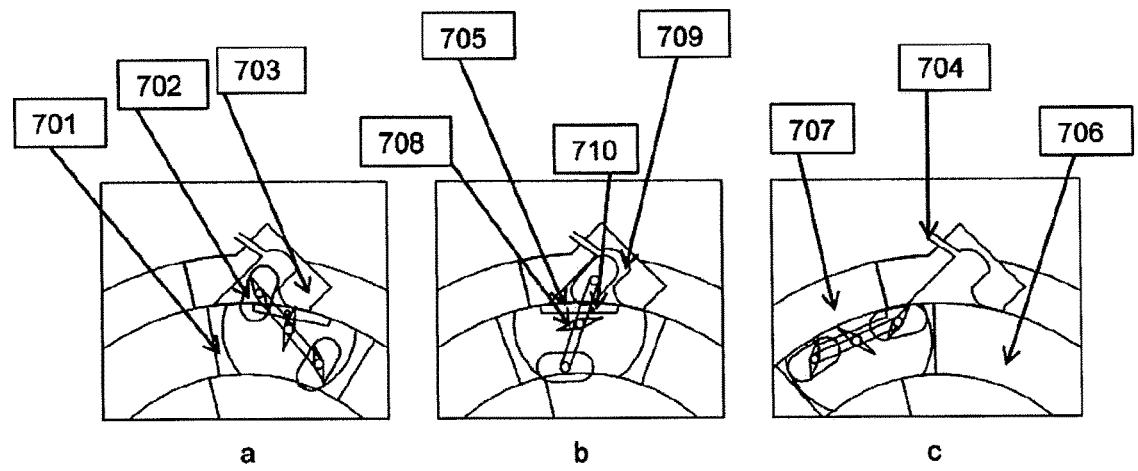
FIGS. 7a to 7c show schematic diagrams of a combustion elements and engagement sections of still further embodiments of combustion engines according to the invention.
Figure 8:
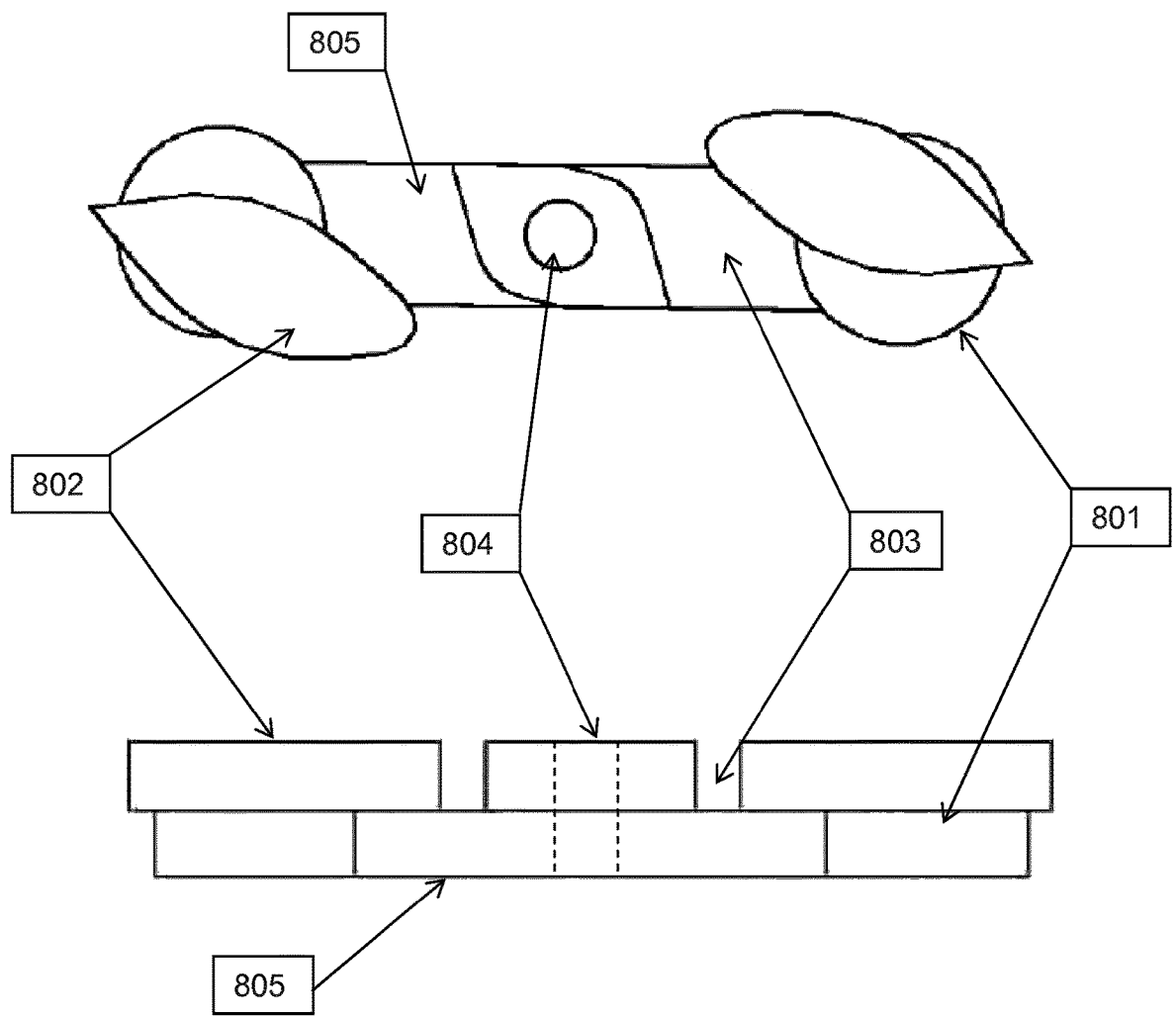
FIG. 8 shows schematic diagrams of a guide runner suitable for use in the FIG. 6 and FIG. 7 embodiments.

FIG. 8 shows a guide runner arrangement for use in the piston arm lever of the FIG. 6 or 7 embodiments. The guide runner 802 as shown in FIG. 8 interfaces with the solenoid pin 607, so as to rotate and guide the piston lever arm 805 into and out of the engine block 606. When used in the FIG. 7 embodiment, the guide runner 802 is fixedly mounted to the piston 702, and so is rotatable together with the piston 702. The guide surface 809 is configured to rotate the piston about the piston axis as the pin 710 is guided along the guide runner, to align the head of the piston into the combustion chamber. Allowing the piston to rotate in this manner means that the piston can rotate out of the combustion chamber to the position shown in FIG. 7c, allowing the pistons to slide along the inside of the engine housing until the guide runner is caught by the/another pin at the/another combustion chamber.

In further embodiments, two or three piston lever blocks at even intervals may be incorporated in the magnet ring with one, two or more combustion chambers located at even intervals in the coil winding section.

A further embodiment may have a complete ring of piston lever blocks interspaced with no magnets, one magnet or n magnets where n is any number between 0 and 100. The width of the magnets and spacers is variable to best suit the intensity of the magnets and field that is produced for optimised electrical generation. Optionally the engine may be configured for optimum power to provide mechanical rotation of an external drive wheel as depicted in 404.

Figure 9:
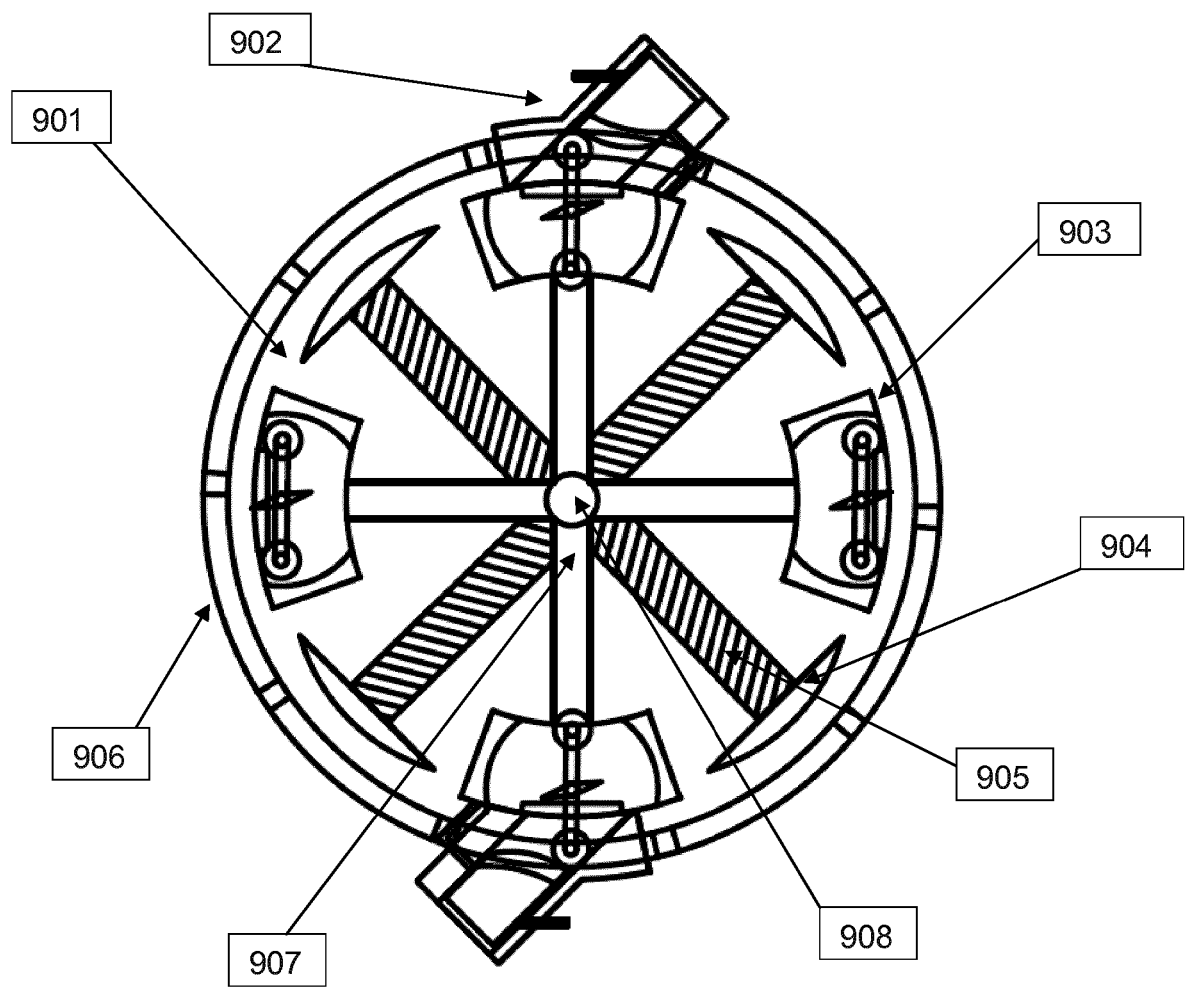
FIG. 9 shows a schematic diagram of a combustion element and an engagement section of an additional embodiment of the combustion engine according to the invention.

Optionally a ring of piston lever blocks without passing through a solid ring of coil windings as shown in FIG. 9, could be attached to a set of spokes 907 to drive a centre hub 808 for mechanical rotation of a drive shaft for application of power delivery to a drive wheel, electrical generator, fan or other rotatable interfaces. The spokes 907 will connect to the piston blocks 903 and rotate with the piston blocks. The piston blocks 903, spokes 907, and hub 808 together form the cylindrical member.

The area 901 may contain further piston blocks for increasing the power of the engine system, or additionally contain a magnet and coil arrangement similar to a traditional DC, synchronous or induction electric motor such that a hybrid engine/generator may be produced.

A combustion system 902 and engine block 903 depicted in this example as being similar to the system shown in FIG. 6. An armature arrangement 905 with coil windings 904 is connected to the hub axle 908 to generate electrical current as it rotates through the magnetic field of the permanent magnets 906.

The invention claimed is:

1. An electric generator, comprising a magnet ring and a plurality of coil windings, wherein the magnet ring comprises a plurality of magnets arranged in a ring about an axis, each magnet forming an arc portion of the magnet ring, wherein the coil windings encircle around the arc portions to form a toroidal shape enclosing the magnet ring, and wherein the magnet ring is rotatable about an axis of rotation and relative to the coil windings to induce current in the coil windings, wherein the magnet ring has a hole running through the magnets, the hole concentric with the axis of the magnet ring, and wherein a wire is threaded through the hole in the magnets to retain the magnets within the magnet ring.

2. The electric generator of claim 1, wherein each coil winding is wound around an axis, and wherein the axes of the coil windings are the arc portions of the magnet ring.

3. The electric generator of claim 1, wherein the axis of the magnet ring is perpendicular to the axes of the coil windings.

4. The electric generator of claim 1, wherein the plurality of magnets have their N-S poles aligned in circumferential directions of the magnet ring and are arranged with like poles facing one another, so the magnets oppose one another.

5. The electric generator of claim 1, wherein immediately adjacent ones of the plurality of magnets are spaced apart from one another by a soft magnetic material that concentrates the magnetic flux between the immediately adjacent magnets.

6. The electric generator of claim 1, further comprising a drive wheel that interfaces with the magnet ring to drive rotation of the magnet ring.

7. The electric generator of claim 1, further comprising a combustion engine, the combustion engine comprising an engine housing, a cylindrical member configured to rotate about an axis within a cavity of the engine housing, a piston, and an engagement section for engaging the piston, wherein the piston is mounted to the engine housing and the engagement section is mounted to the cylindrical member, or the piston is mounted to the cylindrical member and the engagement section is mounted to the engine housing, such that the piston and engagement section periodically rotate past one another as the cylindrical member is rotated within the engine housing, wherein the piston is configured to engage the engagement section as the piston and the engagement section rotate past one another, the engagement section forcing the piston to compress gases in a combustion chamber which fire to drive the rotation of the cylindrical member, wherein the magnet ring is part of or is driven by the cylindrical member of the combustion engine.

8. The electric generator of claim 7, wherein the piston or the engagement section is configured to rotate about an axis that is distinct from the axis of rotation of the cylindrical member.

9. The electric generator of claim 7, wherein the piston is comprised in a combustion element, the combustion element comprising at least one of the pistons, wherein the combustion element is rotatable about a combustion axis that is distinct from the axis of rotation of the cylindrical member, and wherein the piston is mounted to the engine housing and the engagement section is mounted to the cylindrical member, and wherein the piston is configured to move radially towards and away from the combustion axis as the engagement section engages the piston.

10. The electric generator of claim 7 wherein the piston is comprised in a combustion element, the combustion element comprising at least one of the pistons, wherein the combustion element is rotatable about a combustion axis that is distinct from the axis of rotation of the cylindrical member, wherein the piston is mounted to the cylindrical member and the engagement section is mounted to the engine housing, wherein the piston comprises a piston head configured to compress gasses within the combustion chamber, the combustion chamber being within the engagement section.

11. The electric generator of claim 10, wherein the combustion element comprises a drive wheel configured to rotate about the combustion axis, wherein the piston is connected to a piston lever arm, wherein the drive wheel is rotatable about the combustion axis, and wherein the piston lever arm is rotatable about a piston arm axis distinct from the combustion axis and the axis of rotation of the cylindrical member.

12. The electric generator of claim 7, wherein the piston is comprised in a combustion element, the combustion element comprising one of the pistons, wherein the engagement section comprises a piston lever arm which is rotatable about a piston lever axis that is distinct from the axis of rotation of the cylindrical member, wherein the piston lever arm is configured to engage the piston as the piston and the engagement section rotate past one another.

13. The electric generator of claim 12, wherein the engagement section comprises a gear member mounted in a fixed rotation with the piston lever arm, and wherein the gear member comprises at least one tooth for meshing with at least one tooth of the engine housing as the piston and the engagement section rotate past one another.

14. The electric generator of claim 7, wherein the cylindrical member comprises an axle at the axis of rotation of the cylindrical member, and a plurality of spokes, wherein each spoke is connected to the axle at a proximal end of the spoke, and a distal end of at least one of the spokes comprises the coil windings.

15. The electric generator of claim 1, further comprising positive and negative electrodes connected to the coil windings, and a switching control unit that switches the connections of the coil windings to the positive and negative electrodes based on the locations of the magnets relative to the coil windings.

16. The electric generator of claim 15, wherein the switching control unit switches the connections of the coil windings to select an output voltage of the electric generator.

17. The electric generator of claim 15, wherein the switching control unit switches the connections of the coil windings to provide multiple simultaneous output voltages of the electric generator.

18. The electric generator of claim 15, wherein the switching control unit is configured to supply current to the coil windings to make the electric generator act as a motor.

* * * * *